United States Patent
Toscano et al.

(10) Patent No.: US 11,509,796 B2
(45) Date of Patent: Nov. 22, 2022

(54) METHOD AND SYSTEM FOR DISTRIBUTION OF FAX TRANSMISSIONS OF AN ORGANIZATION

(71) Applicant: j2 Cloud Services, LLC, Los Angeles, CA (US)

(72) Inventors: Francis Toscano, Kendall Park, NJ (US); Menik Seneviratne, Culver City, CA (US)

(73) Assignee: J2 CLOUD SERVICES, LLC, Los Angeles, CA (US)

( * ) Notice: Subject to any disclaimer, the term of this patent is extended or adjusted under 35 U.S.C. 154(b) by 0 days.

(21) Appl. No.: 17/240,887

(22) Filed: Apr. 26, 2021

(65) Prior Publication Data
US 2022/0345588 A1    Oct. 27, 2022

(51) Int. Cl.
*H04N 1/44* (2006.01)
*H04N 1/32* (2006.01)
*H04N 1/00* (2006.01)

(52) U.S. Cl.
CPC ......... *H04N 1/444* (2013.01); *H04N 1/00214* (2013.01); *H04N 1/32101* (2013.01); *H04N 1/4426* (2013.01); *H04N 1/4486* (2013.01); *H04N 2201/3209* (2013.01); *H04N 2201/3211* (2013.01)

(58) Field of Classification Search
CPC ............... H04N 1/444; H04N 1/00214; H04N 1/32101; H04N 1/4426; H04N 1/4486; H04N 2201/3209
See application file for complete search history.

(56) References Cited

U.S. PATENT DOCUMENTS

| 9,734,541 B1* | 8/2017 | Pinsonneault ......... G16H 10/20 |
| 10,694,067 B2 | 6/2020 | Toscano et al. |
| 2002/0101620 A1* | 8/2002 | Sharif ................ H04N 1/00209 358/400 |

(Continued)

FOREIGN PATENT DOCUMENTS

| KR | 1020180124507 A | 11/2018 |
| KR | 1020190102763 A | 9/2019 |

OTHER PUBLICATIONS

PCT International Search Report And The Written Opinion Of The International Searching Authority, Or The Declaration for PCT/US2022/026046 (atty. docket No. 1149901480WO), dated Aug. 5, 2022, 10 pages.

(Continued)

*Primary Examiner* — Nicholas Pachol
(74) *Attorney, Agent, or Firm* — Womble Bond Dickinson (US) LLP (57) ABSTRACT

Methods and systems are described for receiving and distributing incoming fax transmissions. In one embodiment, an electronic device receives, over a computer network, an electronic message that includes an electronic document and a fax telephone number of an organization of a plurality of organizations, wherein the fax telephone number is) permanently associated with the organization and 2) uniquely identifies the organization from other organizations in the plurality of other organizations. The device determines a destination address of the organization based on the fax telephone number and transmits the electronic document and the fax telephone number to the destination address.

19 Claims, 6 Drawing Sheets

(56) References Cited

U.S. PATENT DOCUMENTS

| | | | |
|---|---|---|---|
| 2004/0252349 A1 | 12/2004 | Green | |
| 2005/0275871 A1* | 12/2005 | Baird | H04N 1/32411 358/1.15 |
| 2006/0031364 A1* | 2/2006 | Hamilton | H04L 63/0823 709/206 |
| 2006/0209333 A1 | 9/2006 | Takida | |
| 2008/0104408 A1* | 5/2008 | Mayer | H04N 1/32112 713/178 |
| 2010/0060926 A1 | 3/2010 | Smith et al. | |
| 2010/0161993 A1* | 6/2010 | Mayer | H04N 1/32112 713/178 |
| 2010/0208726 A1 | 8/2010 | Oliszewski | |
| 2010/0214590 A1 | 8/2010 | Ray et al. | |
| 2011/0119088 A1* | 5/2011 | Gunn | G16Z 99/00 705/3 |
| 2011/0179266 A1 | 7/2011 | Popesco | |
| 2011/0310890 A1* | 12/2011 | Yanagi | H04N 1/00217 370/352 |
| 2013/0038894 A1 | 2/2013 | Murphy | |
| 2013/0096938 A1* | 4/2013 | Stueckemann | G16H 15/00 705/2 |
| 2014/0240760 A1 | 8/2014 | Dowling et al. | |
| 2014/0268219 A1* | 9/2014 | Ho | H04N 1/32432 358/1.15 |
| 2015/0081325 A1* | 3/2015 | Pletcher | G16Z 99/00 705/2 |
| 2015/0234984 A1* | 8/2015 | Singer | G06Q 40/08 705/3 |
| 2015/0278474 A1* | 10/2015 | Stueckemann | G06Q 10/10 705/2 |
| 2016/0042483 A1 | 2/2016 | Vo et al. | |
| 2016/0342752 A1* | 11/2016 | Stueckemann | G16H 20/10 |
| 2017/0064092 A1* | 3/2017 | Lennstrom | H04N 1/0022 |
| 2017/0187731 A1* | 6/2017 | Hatta | H04L 61/35 |
| 2018/0294048 A1* | 10/2018 | Blumenthal | G06Q 10/1095 |
| 2019/0052770 A1 | 2/2019 | Kamens et al. | |
| 2019/0156055 A1* | 5/2019 | Rosenberg | G06F 16/9535 |
| 2019/0267123 A1* | 8/2019 | Stueckemann | G16H 20/10 |
| 2020/0106923 A1 | 4/2020 | Watts et al. | |
| 2020/0327967 A1* | 10/2020 | Tevis | G06F 16/93 |
| 2020/0412887 A1 | 12/2020 | Cichielo et al. | |

OTHER PUBLICATIONS

PCT International Search Report And The Written Opinion Of The International Searching Authority, Or The Declaration, for PCT/US2022/018183, dated Jun. 9, 2022, 11 pages.

PCT International Search Report and Written Opinion for PCT/US2022/031638, dated Sep. 8, 2022, 10 pages.

* cited by examiner

METHOD AND SYSTEM FOR DISTRIBUTION OF FAX TRANSMISSIONS OF AN ORGANIZATION

FIELD

An embodiment of the disclosure is related to a fax system that distributes fax transmissions of an organization. Other embodiments are also described.

BACKGROUND

Fax messaging continues to be an important avenue for delivery of secure messages between individuals worldwide despite the proliferation of message delivery services that use the Internet. Traditional fax messaging services require both a dedicated fax machine and a dedicated fax number to receive a fax transmission. Modern fax messaging services have eliminated the requirement for a dedicated fax machine, utilizing the Internet to provide greater flexibility for subscribers of those services to transmit and receive fax messages. For instance, a subscriber of a modern fax messaging service is assigned a direct inward dialing (DID) telephone number, which the subscriber distributes to others who wish to send a fax message to the subscriber. The DID telephone number is in effect the subscriber's individual fax number. When an incoming fax transmission is received at a particular DID telephone number, the fax messaging service generates a fax message from the fax transmission in a format that is suitable for transmission over a data network such as the Internet, and sends the fax message to the subscriber (e.g., to the subscriber's e-mail address).

SUMMARY

Interoperability is the ability of different computer systems or software programs to exchange and make use of information. In the case of the healthcare industry, interoperability refers to the ability of healthcare service providers (e.g., doctors, insurers, etc.) and Electronic Medical Record (EMR) systems (or Electronic Health Record (EHR) systems) to seamlessly share patient information, which may lead to better coordinated care and lower healthcare costs. For example, in a perfect scenario, when a patient is treated at a hospital, the patient's medical record may be distributed by the hospital's doctor (e.g., via fax, e-mail, etc.) to an EMR system, which then routes the record to other EMR systems and/or to other healthcare service providers who treat the patient (e.g., the patient's personal physician). Interoperability, however, is difficult to achieve. For instance, the healthcare industry has several different EMR service providers, each with different system architectures and each providing EMR services to different groups within the industry (e.g., some EMR service providers focusing on hospitals, while other focusing on smaller healthcare service provider practices). As a result, some EMR service providers do not seamlessly exchange patient data between each other and/or other healthcare service providers, which limits the scope of patient record sharing. Thus, there is a need for a document distribution system that provides interoperability for existing healthcare systems.

The instant disclosure is directed to a method performed by (e.g., a programmed processor of an electronic device, such as a server, of) a fax service provider to distribute incoming fax transmissions. As described herein, such a fax service provider may assign subscribers with a Direct Inward Dialing (DID) (or fax) telephone number to which others may send fax messages. In the case of EMR system interoperability, a healthcare service provider (e.g., a doctor, or more specifically the doctor's practice group) may be permanently assigned the fax telephone number as a unique identifier for use by the healthcare service provider. Such a permanent and unique identifier may serve multiple purposes. For instance, the fax telephone number may be permanently associated with an organization, to which others may transmit documents. In addition, the fax telephone number may uniquely identify the organization from other organizations. For example, many organizations, such as healthcare service providers, may require an identification number that may be issued by a (e.g., government) entity. Healthcare service providers may be assigned a National Provider Identifier (NPI) that distinguishes the providers from one another, and allow the providers to perform certain services. Thus, the fax telephone number may be used in conjunction with (or in lieu of) the NPI to distinguish a service provider from other service providers. The electronic device may receive, over a computer network, an electronic message that includes an electronic document (e.g., a Portable Document Format (PDF) file, etc.) and a fax telephone number of an organization The device may determine a destination address of the organization based on the fax telephone number. Such a destination address (e.g., an e-mail address, an Internet Protocol (IP) address, etc.) may belong to another healthcare service provider, a EHR service provider, and/or a patient. The device transmits the electronic document and the fax telephone number to the destination address. Specifically, the fax service provider may distribute a patient's medical record to one or more EMR systems and/or one or more other healthcare service providers, thereby providing interoperability within the healthcare industry.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure in this disclosure are not necessarily to the same embodiment, and they mean at least one. Also, a given figure may be used to illustrate the features of more than one embodiment of the disclosure, and not all elements in the figure may be required for a given embodiment.

DETAILED DESCRIPTION

Several embodiments of the disclosure with reference to the appended drawings are now explained. Whenever aspects of the embodiments described here are not explicitly defined, the scope of the disclosure is not limited only to the parts shown, which are meant merely for the purpose of illustration. Also, while numerous details are set forth, it is understood that some embodiments of the disclosure may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases are not necessarily referring to the same embodiment.

Figure 1:
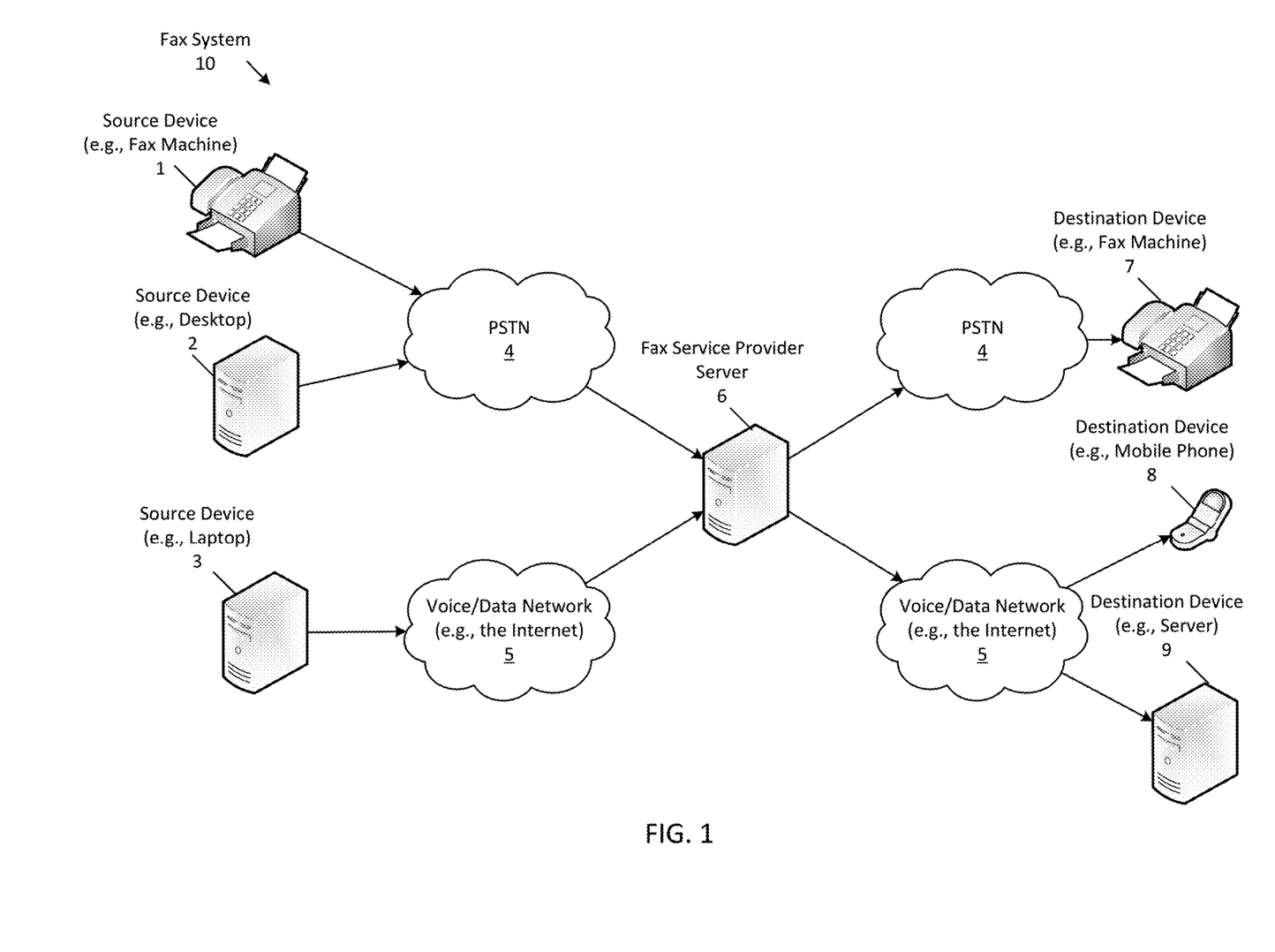
FIG. 1 is a block diagram illustrating a fax system, according to some embodiments.

FIG. 1 is a block diagram illustrating a fax (service provider) system 10, according to some embodiments. The fax system 10 includes three source (or originating) devices 1-3, a Public Switched Telephone Network (PSTN) 4, a voice/data (e.g., computer) network (e.g., the Internet) 5, one or more fax service provider servers (e.g., fax server(s) or electronic device(s)) 6, and three destination devices 7-9. In one embodiment, the system may include more or less (e.g., source, destination, etc.) devices.

As illustrated, the source devices 1 and 2 are coupled to the server 6 via the PSTN, and the source device 3 is coupled to the server via the computer network. As shown, source device 1 is a fax machine and source device 2 is a desktop computer. In one embodiment, devices 1 and 2 may be any electronic device that are capable of placing outgoing calls and/or receiving incoming (e.g., fax) calls over the PSTN 4, e.g., to (and from) the fax service provider server 6. For instance, the fax machine 1 may send a fax transmission through the PSTN 4 using a fax protocol such as the Group 3 protocol defined by the International Telecommunications Union telecommunication Standardization Sector (ITU-T) (e.g., as defined in ITU-T Recommendations T.30 and T.4). A user may operate the fax machine to thus send a fax transmission to a recipient, by for example placing a paper document into the fax machine and entering the phone number of the recipient into the fax machine. The fax machine scans the paper document and converts the contents of the document into an electronic fax format. Alternatively, the machine may convert an electronic document into the electronic fax format. The fax machine places an outgoing call by utilizing Dual-Tone Multi-Frequency (DTMF) signaling. Once the call is answered (e.g., by the server 6), the fax machine transmits the contents of the document, through the PSTN in the form of audio-frequency tones (e.g., a fax tone as per the Group 3 protocol). Once received, the fax transmission may be stored at the server (or more specifically in memory of the server) in a fax file format (e.g., Tagged Image File Format (TIFF)). In one embodiment, the desktop 2 may include a dial-up modem and telephony software, which when executed may use the dial-up modem to transmit a fax transmission via the PSTN. Specifically, the software may be configured to receive (e.g., via a Graphical User Interface (GUI) displayed on a display screen coupled to the desktop) a fax telephone number to which a document is to be transmitted. The desktop may convert the document into the fax file format and place an outgoing call using the dial-up modem to establish a dial-up connection with the server 6 via the PSTN. Once established, the desktop may transmit the fax file, as described herein.

The source device 3 is coupled to the server 6 via the computer network 5. As shown, the source device 3 is a laptop computer. In another embodiment, however, device 3 may be any type of device that is capable of transmitting fax transmissions (e.g., as electronic messages) over the computer network to the fax service provider server 6. In particular, the source device 3 may include fax software, which when executed by the device is configured to send fax transmissions as electronic messages that include fax files (or fax messages) in any format, as described herein. As another example, the source device 3 may establish a communication data link (e.g., via an Application Programming Interface (API)) with the fax server 6, and transmit the electronic message over the connection. In another embodiment, the source device may transmit the message to the fax server using any known method. In some embodiments, the source device 3 may be a portable device, such as a mobile phone (or smart phone).

Also shown, the destination device 7 is a fax machine that is coupled to the server 6 via the PSTN 4. The destination devices 8 and 9 are a mobile phone and (one or more) server(s), respectively, which are coupled to server 6 via the computer network 5. In one embodiment, device 7 may be any electronic device that is capable of transmitting/receiving fax transmissions over the PSTN, and devices 8 and 9 may be any electronic device that is capable of transmitting/receiving fax transmissions over the computer network 5, as described herein. More about transmitting and receiving fax transmissions over computer network is described herein.

In one embodiment, although some (e.g., source and/or destination) devices are illustrated as being coupled through a specific network, at least some of the devices may be configured to couple through one or more networks. For example, the source device 2 may be configured to transmit messages to the server (and/or to one or more destination devices), via the PSTN 4 and/or the data network 5. In another embodiment, at least some of the source and/or destination devices may be capable of performing fax transmission operations, as described herein.

In one embodiment, the voice/data network 5 may include infrastructure that enables one or more devices to send and receive fax transmissions (e.g., as electronic messages), such as routers, access points, one or more servers, etc. In some embodiments, the network may also include one or more cell towers, all of which may be part of a communication network that supports data transmission (and/or voice calls) for mobile devices (e.g., a 4G Long Term Evolution (LTE) network). More about the infrastructure of the network is described herein.

In another embodiment, the PSTN 4 may be a combination (e.g., having one or more) circuit-switched (telephone) networks that may be operated by one or more telephony operators in order to allow telephones and/or fax machines to communicate with one another.

The server 6 is a stand-alone server computer or a cluster of server computers configured to perform one or more fax service provider operations, as described herein. In one embodiment, the server may be a part of a cloud computing system that is capable of performing the fax service provider operations as a cloud-based service. More about these operations is described herein.

Figure 2:
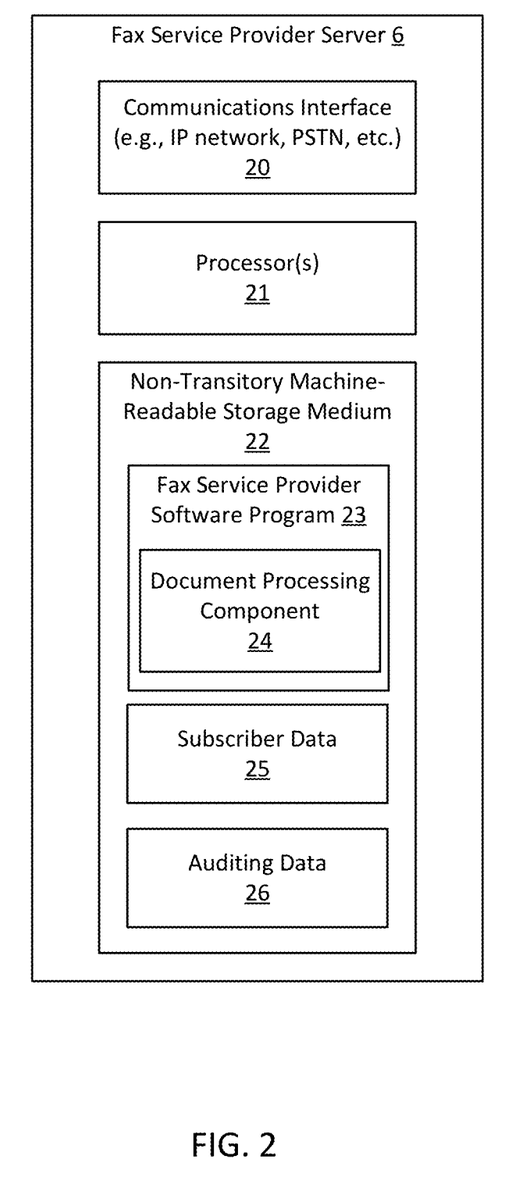
FIG. 2 shows a block diagram illustrating a fax service provider server, according to some embodiments.

FIG. 2 shows a block diagram illustrating the fax service provider server 6, according to some embodiments. The fax server is operated by one or more fax service providers, and is capable of processing fax transmissions destined for subscribers of one or more fax services. Typically, fax services (or more specifically the fax service provider) assigns a different Direct Inward Dialing (DID) telephone number (e.g., fax telephone number) to each subscriber. A subscriber distributes the DID number to others who wish to send a fax message (as an incoming fax transmission) to the subscriber. The DID number is in effect the subscriber's individual fax number. When a sending party sends a fax transmission to the subscriber's DID number (e.g., over the PSTN as described herein), the server receives the fax transmission and generates a fax message from (or decode message content in) the fax transmission. The generated fax message may be in a format that is viewable by the subscriber on an electronic (e.g., destination) device, e.g., Portable Document Format (PDF), TIFF, etc., and is made available to the subscriber (e.g., for viewing).

In another embodiment, the fax server 6 may receive an incoming fax transmission (e.g., as an electronic message) over the voice/data network 5. For example, a user (e.g., another subscriber) may transmit an e-mail over the data network (e.g., Internet) that includes (e.g., as an attachment) a fax file (message or transmission). In one embodiment, the fax file may be in a fax format, such as TIFF. In another embodiment, the fax file may be a document that includes text and/or images. In some embodiments, the fax file may be a searchable electronic document, such as a searchable PDF. In some embodiments, the fax file may be in a format that is executable by one or more applications that allows a user to search, add, remove, and/or edit data (e.g., text, images, etc.) in the file. For example, the file may be in a word processing format that is executable by a word processing software application, a spreadsheet format that is executable by a spreadsheet software application, a presentation format that is executable by a presentation application. In one embodiment, the fax file may be in any file format that is editable and/or searchable.

In one embodiment, the received electronic message may also include an outbound (or recipient) address to which the fax file contained therein is being transmitted. Returning to the previous example, the e-mail may include an e-mail address of a subscriber to which the fax transmission is to be routed (or distributed) by the fax server. To distribute the fax transmission, the e-mail address may indicate the recipient address and/or identifying information of the subscriber. For example, the recipient address may be the user name of the e-mail address, which may be the DID telephone number that is assigned to the subscriber to which the fax is to distributed (e.g., by a fax transmission over the PSTN), and the domain name of the e-mail address may be associated with the fax service provider. Once the electronic message is received, the fax server may determine how to distribute the fax transmission based on the recipient address. Returning to the previous example, once the e-mail is received, the fax server may be configured to determine how to distribute the fax transmission based on the e-mail address, or more specifically the user name (e.g., the DID fax telephone number) of the e-mail address. More about determining how to distribute incoming fax transmissions based on the fax telephone number is described herein.

Once an incoming fax transmission is received, the fax server 6 may make the fax message of the incoming fax transmission available to a subscriber through various means. In one embodiment, the fax server may transmit the fax message to an e-mail address (e.g., a destination address) of the subscriber. In another embodiment, the fax server stores the fax message in a data storage until it is accessed there by the subscriber over the computer network 5. For example, the fax message may remain stored on a web server accessible over the Internet. In another embodiment, a notification is sent to (addressed to) the subscriber that indicates that a new fax message is available, such as a Short Message Service (SMS) message. In one embodiment, the notification may include information as to how to access the new fax message (e.g., an e-mail notification may contain a link, such as a Uniform Resource Locator (URL), to the stored location of the fax message). In another embodiment, the notification may be transmitted as any type of electronic message (e.g., a SMS message, a Multimedia Messaging Service (MMS) message, etc.) to a known telephone number associated to the subscriber. In this case, the electronic message may include the information mentioned above, such as a URL. In another embodiment, the messages (e.g., MMS messages) may include the generated fax message as an attachment.

In another embodiment, the fax server may transmit (e.g., route) an incoming fax transmission that is received from a source device in a similar manner as described herein to one or more destination devices. For instance, the fax server may transmit a fax transmission via the PSTN 4 to a destination device (e.g., device 7). In particular, the fax server may place an outgoing call (e.g., to a fax telephone number associated with a subscriber), and once the call is answered the fax server transmits the fax transmission, as described herein.

In some embodiments, the fax server 6 may transmit (or distribute) an incoming fax transmission (or more specifically the fax file received in the transmission) over a communication data connection with one or more destination devices. In particular, the fax server may be configured to establish, over the computer network 5 and via an API, a communication data connection with a destination device, such as server 9 using a destination address of the server, for example an Internet Protocol (IP) address or a domain name. Once established, the fax server may transmit an electronic message (e.g., as one or more data packets, such as IP packets) that includes the fax transmission (or more specifically the fax file or processed fax file) over the data connection to the destination device. In one embodiment, the fax server may establish a connection via a website that is hosted by (or on) the destination device. In this case, the destination address may be a Uniform Resource Locator (URL), which includes the domain name associated with the destination device. The fax server may establish a data connection to the URL according to any data transfer (application) protocol, such as Hypertext Transfer Protocol (HTTP), File Transfer Protocol (FTP), etc. In some embodiments, the fax server may use any (e.g., Application layer) protocol in the server's protocol stack to establish a connection with a destination device and transmit data (e.g., as one or more data packets).

In some embodiments, the fax server 6 may transmit the electronic message as an e-mail (e.g., a Simple Mail Transfer Protocol (SMTP) message). In this case, the electronic message may be contained (e.g., as text) within the body of the e-mail. In another embodiment, the electronic message may include the fax message (e.g., the electronic document)

as an attachment to the e-mail, which is formatted according to the Multipurpose Internet Mail Extensions (MIME) protocol.

In another embodiment, the fax server 6 may establish a secure communication data connection with the destination device. Specifically, the fax server may establish, over the computer network 5 a communication data connection with destination device according to its destination address (e.g., IP address) and using an encryption protocol, such as Secure Sockets Layer (SSL), Transport Layer Security (TLS), etc. For instance, to access the website hosted by the destination device, the fax server may use the application layer protocol HTTP over TLS or SSL (e.g., HTTPS). Once the secure communication data connection established, the fax server (encrypts and) transmits data (e.g., electronic messages) to the destination device according to the encryption protocol. In some embodiments, the fax server may establish a secure communication tunnel with the destination device. For instance, the fax server may establish using the IP address or domain name of the destination device, a Virtual Personal Network (VPN) connection with the destination device. Once established, the fax server may transmit the electronic message via the VPN connection. For instance, the fax server may establish a communication data connection with a VPN server through which (e.g., a VPN connection is established in which) the fax server may communicate with the destination device (e.g., using any communication protocol, such as HTTPS). As another example, once the secure communication tunnel is established, the fax server 6 may transmit an e-mail (SMTP message) with the fax message attached, as described herein.

In some embodiments, the fax server 6 may distribute incoming fax transmissions according to one or more (e.g., international) standards for data transfers. In particular, when distributing incoming fax transmissions to healthcare service providers (or systems), such as doctors, Electronic Medical Record (EMR) systems (or Electronic Healthcare Records (EHR) systems), healthcare insurers, doctors, medical technicians, pharmacists, etc., the fax server may generate and transmit electronic messages that include at least a portion of the incoming fax transmission according to the one or more international medical format messaging standards, such as Health Level Seven (HL7) standard, Digital Imaging and Communication in Medicine (DICOM) standard, etc. For example, upon receiving an incoming fax transmission that includes a fax file (e.g., a medical or patient record) that is to be routed to a EMR service provider (e.g., server), the fax software may generate a HL7 message that includes the fax file. In one embodiment, to generate the HL7 message, the fax server may embed the fax file into one or more segments of an HL7 message. For instance, when the fax file is a PDF file that includes medical data (e.g., text, images, etc.), the fax software may embed the (e.g., medical data of the) file into the HL7 message. In one embodiment, the fax software may attach (or embed) any type of file format into an HL7 message in order to generate the electronic message. In some embodiments, along with the fax file, patient information may also be added into the message, such as the fax telephone number. Once the electronic HL7 message is generated, the fax server may transmit the message to a destination device (or address) according to one or more communication protocols of the Transmission Control Protocol/Internet Protocol (TCP/IP). For instance, the destination address may be an IP address of server 9, which may be an EHR service provider.

In one embodiment, in addition to (or in lieu of) transmitting the fax file as a HL7 message, the fax server may convert (or generate) the fax file into another document type (or format). In particular, the fax server may convert the fax file into a HL7-Clinical Document Architecture (CDA) document that is a HL7 standard for the representation and machine processing of clinical documents. For instance, the fax server may encode (or embed) the fax file, which may be any file format such as a PDF, TIFF, word processing format, etc., as the body of the HL7-CDA document. In one embodiment, transmitting a HL7-CDA document may be preferable rather than simply transmitting the fax file (e.g., word processing document), since metadata may be added to a header of the HL7-CDA document, such as the fax telephone number.

In some embodiments, the fax server 6 may distribute (and/or receive) fax files as secure direct messages in order to protect sensitive information. For instance, the fax server may generate and transmit secure messages that are Health Insurance Portability and Accountability (HIPPA) compliant. For instance, the fax server may encrypt the fax file according to HIPAA requirements, and may transmit the encrypted file across a secure connection to a destination address (e.g., via HTTPS). In one embodiment, the fax server may use any known method to encrypt (and/or decrypt) fax files in order to produce secure messages.

As described thus far, the fax server 6 may be configured to establish a communication data connection with one or more destination devices in order to transmit (or distribute) fax files of incoming fax transmissions. In another embodiment, the fax server may receive incoming fax transmissions through one or more communication data connections with a source device, such as laptop 3. For instance, the source device may establish any of the communication data connections with the fax server, as described herein. For example, the source device may access a website hosted by the fax service provider server 6 and transmit an incoming fax according to any Application Layer Protocol, such as HTTPS.

The server includes a communication interface 20, one or more processors 21, and a non-transitory machine-readable storage medium 22. Examples of non-transitory machine-readable storage medium may include read-only memory, random-access memory, CD-ROMS, DVDs, magnetic tape, optical data storage devices, flash memory devices, and phase change memory. Although illustrated as being contained within the server 6, one or more of the components may be a part of separate electronic devices, such as the medium 22 being a separate data storage device. As shown, the non-transitory machine-readable storage medium has stored therein a fax service provider software program (or fax software) 23, subscriber data 25, and auditing data 26. The fax software includes a document processing component 24, which when executed by the one or more processes becomes configured to process an incoming fax transmission to generate a searchable electronic document and to add an electronic signature, as described herein.

The communications interface 20 provides an interface for the fax server 6 to receive an incoming fax transmission (e.g., from the source devices 1-3) and/or transmit fax transmissions (e.g., to the destination devices 7-9) over a network, such as the PSTN 4 and/or the computer network 5. For example, the communication interface is configured to establish a communication link with source device 1 over the PSTN in which an incoming fax is received through a downlink signal, and is configured to establish a communication link with destination device 7 over the PSTN in which a fax is transmitted through an uplink signal. Similarly, the interface is configured to establish a data connection (such as a VPN connection) with one or more destination devices.

In one embodiment, the subscriber data 25 may include information of subscribers of one or more fax services. Specifically, the data may be in the form of a data structure that includes a lookup table having subscriber (e.g., identifying) information, such as the subscriber's name, the subscriber's personal telephone number (which may be associated with a destination device, such as the mobile phone 8), and a subscriber's assigned DID telephone number. In some embodiments, the data structure may include one or more destination addresses to which the fax service provider transmits (e.g., routes, forwards, or distributes) incoming fax transmissions that are received for a specific subscriber. For example, a subscriber's destination addresses may include an e-mail address, a (e.g., voice) telephone number, a fax telephone number, an IP address, etc. In one embodiment, the subscriber data may include subscriber settings or preferences, such as which destination address the subscriber wishes incoming fax transmissions to be distributed by the fax system. In particular, such a preference may be based on a source address from which the incoming fax transmission is received. For instance, a source address may be a fax telephone number of source device 1, which is used to transmit a fax file to a recipient's address (e.g., a subscriber's DID telephone number). In this case, the subscriber data may associate the source address to one or more destination addresses to which (future) incoming fax transmissions from the source address are to be distributed. In another embodiment, the subscriber preferences may indicate what format fax transmissions are to be transmitted to a subscriber. For instance, a subscriber's preferences may indicate that incoming fax transmissions are to be distributed to the subscriber in a fax format, such as TIFF, and/or to be routed in another format, such as PDF. As another example, the subscriber data may indicate how to format fax transmissions to specific destination address. For instance, for a destination address associated with a EHR service provider, the data may indicate that fax transmission are to be transmitted as HL7-CDA messages, while a destination address associated with another healthcare service provider may be transmitted over the PSTN. In one embodiment, the subscriber preferences may indicate whether the (document processing component 24 of the) fax software is to perform additional (or special) processing operations upon incoming fax transmissions. More about the operations performed by the component 24 is described herein.

In some embodiments, the auditing data 26 may include information regarding fax transmissions that have been received, processed, and/or transmitted (or routed) by the fax service provider server 6. For example, the auditing data may be stored in a data structure that includes information, such as time stamps and document information of incoming fax transmissions. More about the auditing data is described herein.

The processor 21 may include one or more data processing circuits, generically referred to herein as "a processor." The processor may execute the fax software 23 that is (at least partially) stored within memory 22 to perform some or all of the fax service provider operations and methods that are described herein, for one or more of the embodiments related to the server 6. In particular, the fax software (e.g., which when executed by the processor 21) is capable of processing fax transmissions destined for subscribers of one or more fax services. For instance, the fax software is configured to receive an incoming fax transmission (e.g., an electronic message that includes an electronic document, such as medical data) and a fax telephone number that uniquely and permanently identifies a user (e.g., patient) of which the electronic document is associated. The fax software is configured to determine how to distribute the electronic document, and transmit the electronic document and the fax telephone number to a destination address. More about the operations performed by the fax software is described herein.

In one embodiment, the document processing component 24 is configured to process a received fax transmission. For instance, the received fax transmission may be an electronic message (e.g., via e-mail, communication data connection, etc.). that includes a (e.g., first) searchable electronic document in any format, such as a word processing format, a spreadsheet format, or a presentation format, as described herein. The component generates another (e.g., second) searchable electronic document (e.g., in another file format that is different than the first document's file format) from the first searchable electronic document. For instance, the second searchable electronic document may be a searchable PDF document, which is generated from a word processing document. In one embodiment, the generated second searchable electronic document may preserve (or retain) all formatting of the first document (e.g., font, font size, font color, spacing, margins, alignment, etc.). For instance, the generated searchable PDF document may include embedded fonts from the first searchable electronic document (e.g., word processing document). The component adds an electronic signature to authenticate the second document, and the second document is transmitted to a destination device. Thus, the routed fax transmission remains a searchable document and includes an electronic signature that authenticates the transmission of the document. This is in contrast to conventional fax transmissions, which are transmitted in non-searchable fax formats, such as TIFFs. More about the operations performed by the component is described herein.

As described herein, a fax service provider may be employed to provide interoperability between different groups and organizations within a particular industry, such as the healthcare industry. In this case, incoming fax transmissions that include medical data, such as patient records, patient images (e.g., Magnetic Resonance Imaging (MRI) images, etc.) may be distributed to one or more recipients (e.g., the patient, one or more healthcare service providers, one or more EHR service providers, etc.) based on a fax telephone number. In this case, the fax telephone number may be permanently assigned to a specific subscriber or user (e.g., patient), such as a Social Security Number (SSN) in order to uniquely identify the specific patient across different groups and organizations, as well as being a method for distributing documents within the industry. Similarly, the fax telephone number may be permanently assigned to a person, group, or organization, such as a healthcare service provider (e.g., doctor) to play a similar role. For instance, an assigned fax telephone number that is a unique number may be used in conjunction with a National Provider Identifier (NPI) to uniquely identify the provider throughout the healthcare industry (e.g., by uniquely identifying the provider from other providers within the industry, etc.), along with being the method of distributing any medical documents between patients and other healthcare service providers.

Figure 3:
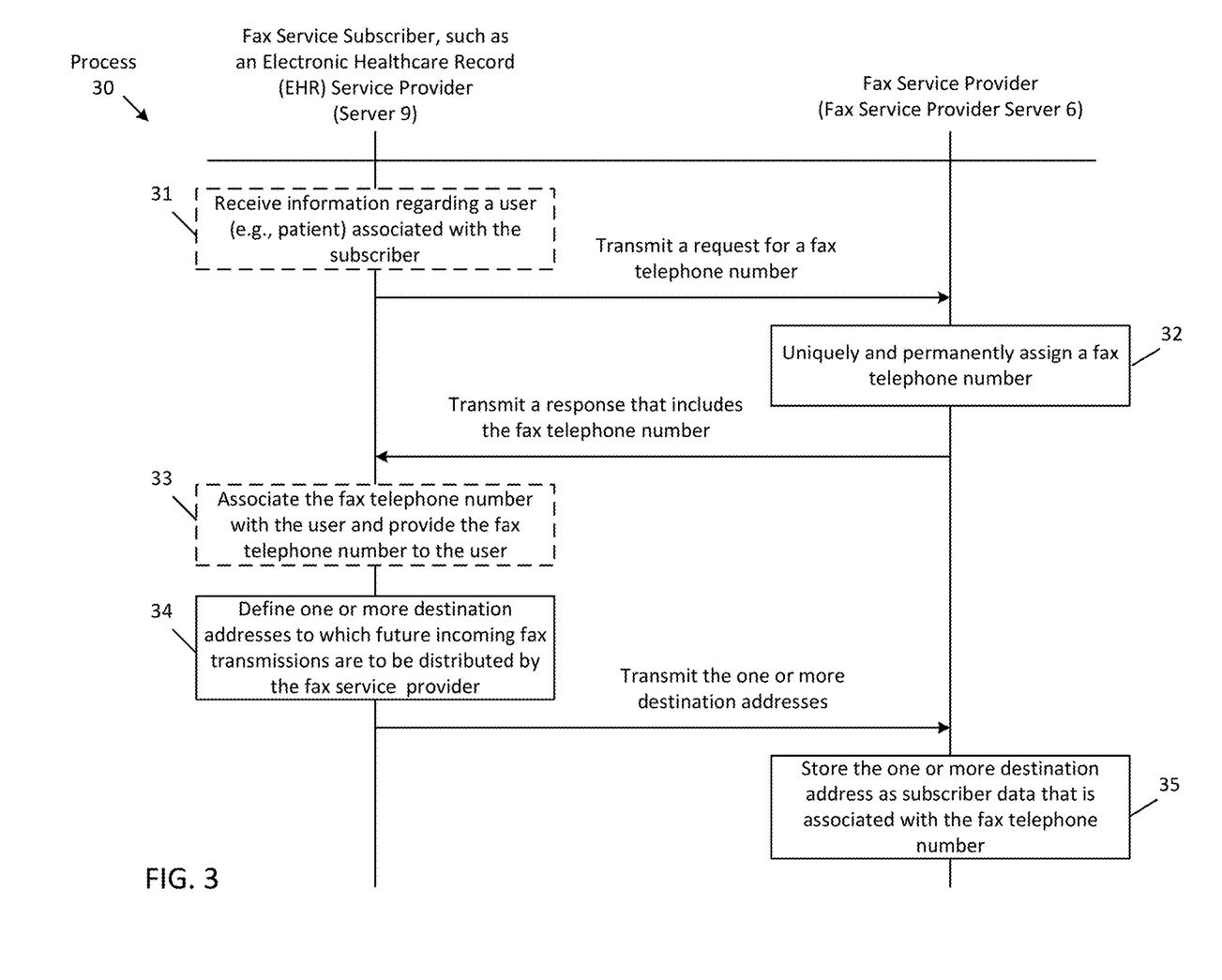
FIG. 3 shows a signal diagram of one embodiment of a process for uniquely and permanently assigning a fax telephone number, according to some embodiments.

FIG. 3 shows a signal diagram of one embodiment of a process 30 for uniquely and permanently assigning a fax telephone number, according to some embodiments. Specifically, this figure shows operations performed by a fax service subscriber, such as (e.g., a server 9 of) an EHR service provider and the (e.g., fax server 6 of the) fax service provider. In another embodiment, the operations described herein may be performed to assign fax telephone numbers to other service providers within other industries, such as telecommunication service providers within the telecommunication industry, etc.

The process 30 begins by the server 9 receiving information regarding a user (e.g., a patient) associated with the subscriber (at block 31). For instance, the server 9 may receive (e.g., via a GUI displayed on a display screen) patient information, such as a patient's name, a patient's address, characteristics (e.g., hair color, eye color, etc.). In one embodiment, such information may be received in response to a determination that the patient's information is not contained within a patient database (e.g., being a new patient or subscriber in) of which the EHR service provider manages. In some embodiments, this determination may be made across various databases that are each managed by one or more EHR service providers. The server 9 transmits a request to the (e.g., fax server 6 of the) fax service provider for a fax telephone number for the user. In one embodiment, the request may include information of the user, such as the user's name and/or a unique identifier associated with the user (e.g., a user ID, which may be assigned by the fax service subscriber, the user's SSN, etc.). In another embodiment, the request may not include any information associated with a user of the fax service subscriber. In response, the fax server 6 uniquely and permanently assigns a fax telephone number, a ten-digit telephone number (at block 32). Specifically, the fax server 6 may perform a table lookup of available fax telephone numbers, and assign (or associate) one of the available numbers to the user. In one embodiment, the fax server may associate the assigned fax telephone number with at least some of the user information, and store the association within memory (e.g., within subscriber data 25). In one embodiment, the assigned fax telephone number is permanent, such that the fax telephone number will always be assigned to that user (e.g., will not or never be recycled by the fax service provider to be assigned to a different user). Thus, unlike conventional telephone companies that may recycle a subscriber's telephone numbers when service is terminated, the assigned fax telephone number may remain associated with the user, regardless of whether the subscriber, e.g., EHR service provider (and/or the user) remains an existing subscriber. In some embodiments, the fax service provider may uniquely assign the fax telephone number to the subscriber, in order for the subscriber (e.g., the EHR service provider) to assign the user the fax telephone number. For instance, the fax server may add the fax telephone number into the subscriber's data 25 and associate the number with the subscriber. In this way, a fax telephone number may be assigned to a user, without the fax service provider requiring any personal information from the user.

The fax server 6 transmits a response to the server 9 that includes the fax telephone number. The EHR service provider associates the fax telephone number with the user and provides the fax telephone number to the user (at block 33). Specifically, the EHR service provider may store the fax telephone number in user (patient) records that are stored in a database (which may be a part of the server 9). In one embodiment, the EHR service provider may provide the fax telephone number through any method. For instance, the provider may transmit an electronic message (e.g., SMS message, e-mail, etc.) to the user that includes the fax telephone number. The EHR service provider defines one or more destination address to which future incoming fax transmissions are to be distributed by the fax service provider (at block 34). Specifically, the server 9 may receive the one or more destination addresses to which the user wishes fax files (e.g., medical records) that are transmitted as incoming fax transmissions are to be distributed by the fax server 6. In one embodiment, the destination addresses may be any type of destination address, such as a fax telephone number, an IP address, an e-mail address, etc. that belong to (or are associated) with the user, other users (or individuals), and/or groups or organizations. In the case of the healthcare industry, the groups or organizations may include one or more healthcare service providers and one or more EHR service providers. In one embodiment, the server 9 may also define subscriber preferences. For example, the server may indicate to which destination addresses incoming fax transmissions are to be distributed by the server 6 based on a source address of a source device, such as a fax machine of the user's healthcare service provider. The server 9 transmits the one or more destination addresses (and/or the subscriber preferences) to the fax server 6, which stores the one or more destination addresses (and/or subscriber preferences) as subscriber data that is associated with the fax telephone number (at block 35). In one embodiment, the server 9 may also transmit one or more user preferences for one or more destination addresses.

As described herein, the process 30 may be performed to assign a unique and permanent fax telephone number to a person, group, or organization within a particular industry, such as a healthcare service provider (e.g., the EHR service provider, a doctor, etc.) in the healthcare industry. As an example, the assigned fax telephone number may be permanently associated with an organization, such as the EHR service provider, and may uniquely identify the organization from other organizations (e.g., other EHR service providers). In this case, at least some of the operations in process 30 may be omitted to assign the number to the healthcare service provider, such as operations in blocks 31 and 33. Thus, to assign the telephone number, the server 9 of the healthcare service provider who may be a subscriber with the fax service provider transmits the request, and in response the server 6 assigns the fax telephone number and transmits the number to the server 9. The server 9 may then define one or more destination addresses to which the EHR service provider wishes future incoming fax transmissions be distributed by the fax service provider, and transmits the destination addresses to the server 6.

In one embodiment, the permanent fax telephone number may be used to uniquely identify one organization from other organizations. In particular, the fax telephone number may be a unique identifier that may be used in conjunction with (or as) a National Provider Identifier (NPI), which may be issued to healthcare service providers, such as EHR service providers, physicians, etc. in the United States. Thus, the assigned fax telephone number may be used to uniquely identify service providers, as well as being a recipient address to which documents (e.g., a patient's medical record, etc.) may be transmitted.

Figure 4:
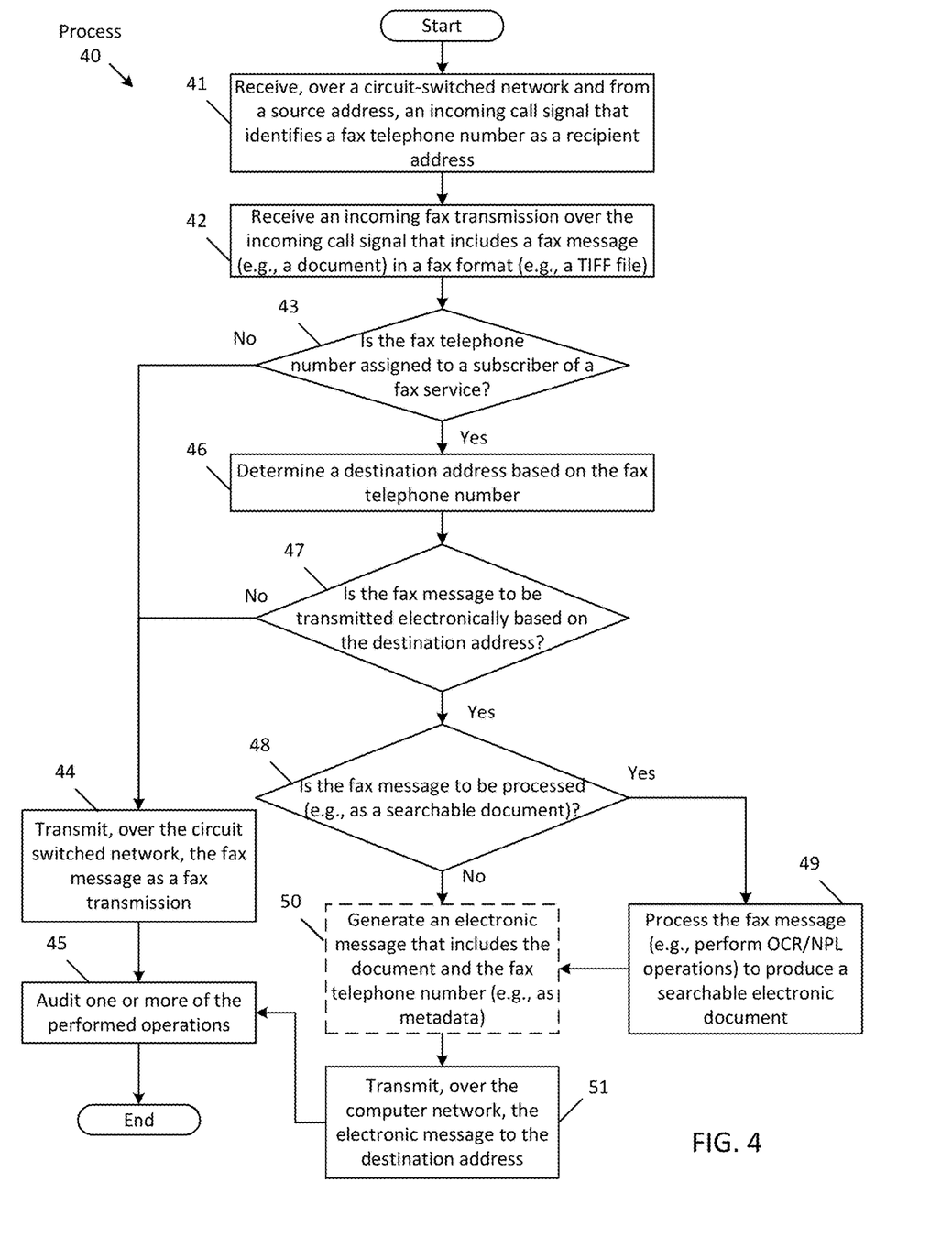
FIG. 4 is a flowchart of one embodiment of a process to receive and distribute incoming fax transmissions, according to some embodiments.
Figure 5:
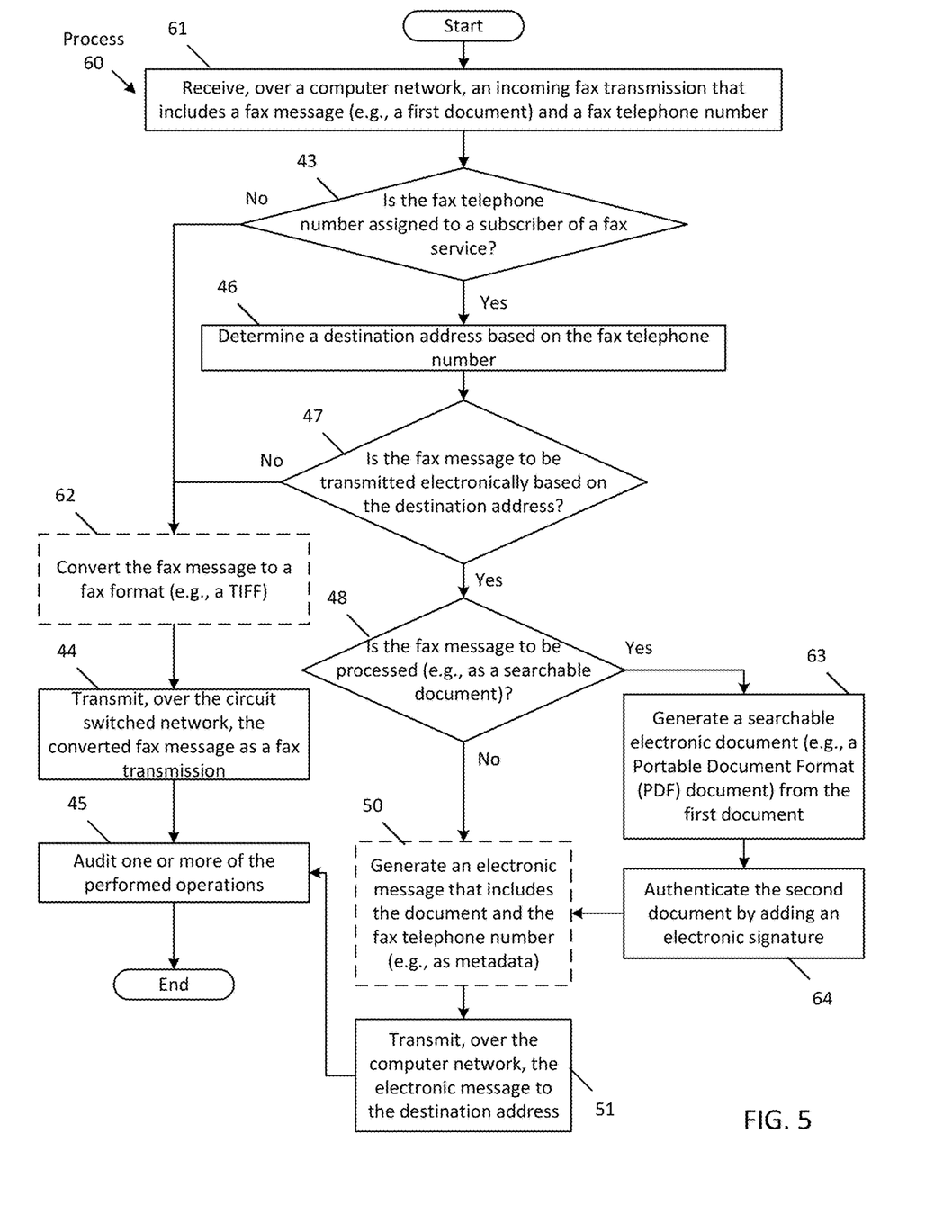
FIG. 5 is a flowchart of another embodiment of a process to receive and distribute incoming fax transmissions, according to some embodiments.

FIGS. 4 and 5 are flowcharts of processes 40 and 60 for receiving and distributing incoming fax transmissions, according to some embodiments. These processes may be performed by the (e.g., fax service provider software program 23 of the) fax service provider server 6 of the fax system 10 illustrated in FIG. 1. For example, the (e.g., document processing component 24 of the) fax software 32 that is being executed by one or more processors 21 of the server 6 may perform at least some of the operations described herein.

FIG. 4 is a flowchart of the process 40 for receiving and distributing incoming fax transmissions that are received over the PSTN 4, according to one embodiment. The process 40 begins by the fax server 6 receiving, over a circuit-switched network (e.g., the PSTN 4) and from a source address (e.g., associated with a source device, such as fax machine 1), an incoming call signal that identifies a fax telephone number as a recipient address (at block 41). For instance, the (fax software 23 of the) fax server 6 may identify information related to the incoming call signal, such as the fax telephone number through caller ID. The fax server receives an incoming fax transmission over the incoming call (e.g., in the form of audio-frequency tones) that includes a fax message (e.g., a document) in a fax format (e.g., a TIFF file) (at block 42). In one embodiment, the fax message may be a document that may include includes at least one of text and images. As an example, the incoming fax transmission may be received from (or transmitted by) a (e.g., source device of a) healthcare service provider. In which case, the fax message may include a document with medical data regarding a user (or patient) associated with the healthcare service provider, such as medical record (or at least a partial medical record) of the user (e.g., a treatment, a diagnosis, etc.) and/or a medical image of the user (e.g., MRI image).

The fax server determines whether the fax telephone number (identified as the recipient address) is assigned to a subscriber of a fax service (at decision block 43). For instance, the fax server may determine whether the fax telephone number is associated with a subscriber (or a user associated with the subscriber) of the fax service. In one embodiment, the fax server may search the subscriber data 25 by performing a table lookup using the fax telephone number, for example. Specifically, the server may perform a table lookup into the subscriber data 25 to determine whether the fax number is associated with subscriber (and/or user) information that was received from the request to assign the fax telephone number, as described in FIG. 3. In another embodiment, the software may determine whether subscriber information (e.g., a subscriber's name) is associated with the fax telephone number. In one embodiment, the software may determine whether the subscriber is an "existing" subscriber. For instance, an existing subscriber may be a subscriber who has an existing subscription (e.g., whose fees are paid up-to-date), or a subscriber whose subscription hasn't expired. In response to the fax telephone number not being associated with a (e.g., existing) subscriber (and/or a user associated with the subscriber), the server transmits, over the circuit-switched network, the fax message as a (outgoing) fax transmission (at block 44). For instance, the fax server (through the communication interface 20), places an outgoing call to the fax telephone number and sends the fax message, which may be a fax formatted document, over the outgoing call. Once the outgoing call is answered (e.g., by a destination device, such as fax machine 7), the fax server transmits the fax message as audio-frequency tones, as described herein.

The server audits one or more of the performed operations (at block 45). In particular, the server may audit the operations by storing data (e.g., in the auditing data 26) regarding the reception of the incoming fax transmission and/or transmission of the document. For example, the server may store a reception time stamp at which the incoming fax transmission is received, and a transmission time stamp at which the fax transmission was transmitted over the circuit switched network. In one embodiment, other information may be stored as well. More about the auditing data is described herein.

If, however, the fax telephone number is (e.g., uniquely and permanently) assigned to a subscriber, the fax server determines a (or one or more) destination address(es) based on the fax telephone number (at block 46). In particular, the fax server may determine a destination address (e.g., a destination fax telephone number) associated with the fax telephone number. For instance, the fax server may perform a table lookup using the fax telephone number into the subscriber data 25 to select the destination address. For example, when the fax telephone number is of a patient who is receiving care from a healthcare service provider, the destination address may of (or associated with) 1) the patient, 2) another healthcare service provider, and 3) a EHR service provider. In one embodiment, the server may select the destination address based on subscriber preferences. Specifically, the subscriber preferences may indicate which destination address the fax message is to be distributed. As an example, the subscriber preferences may indicate which destination address is to be selected based on an inbound (or source) address associated with the incoming fax transmission. In the case of the incoming fax transmission over the incoming call signal, the source address may be a fax telephone number of a source device (e.g., fax machine 1). Returning to the previous example, when the source address is a fax telephone number of a hospital where the patient is being treated, the subscriber preferences may indicate that a fax telephone number of the patient's primary care physician be the destination address.

The server 6 determines if the fax message is to be transmitted as an electronic message based on the destination address (at decision block 47). In particular, the server determines whether the fax message is to be transmitted as the electronic message (e.g., over a communication data connection, such as a VPN connection as an e-mail, etc.) or whether the fax message is to be transmitted as audio-frequency tones via the PSTN, based on the subscription data 25. For instance, the server 6 may determine whether the destination address to which the fax message is to be distributed indicates that the fax message is to be transmitted over the computer network, such as an e-mail address or an IP address, or whether the fax message is to be transmitted over the PSTN, such as a fax telephone number. In another embodiment, the determination may be based on subscriber preferences in the subscriber data. For instance, the subscriber data 25 may include indicate whether a subscriber (or user) associated with the fax telephone number has enabled electronic distribution, via the computer network, of an incoming fax transmission. In one embodiment, the enablement of this distribution may be a fax service of which the subscriber subscribes. If the server determines that the fax message is not to be transmitted electronically (e.g., based on the destination address being a fax telephone number, etc.), the server proceeds to block 44 to transmit the fax message in the fax format.

If, however, the fax message is to be transmitted as an electronic message (e.g., based on the destination address), the server determines if the fax message is to be processed by performing document processing, such as processing the message as a searchable document (at decision block 48). Specifically, the fax server may make this determination based on subscriber preferences in the subscriber data 25 that are associated with the fax telephone number and/or the destination address. For instance, the fax software may determine whether the subscriber has elected for the incoming fax transmission to be processed to produce a searchable document that is to be distributed to one or more distribution addresses. Such an election may be based on whether the subscriber (or the user) to which the fax telephone number is assigned has paid additional subscription fees to the fax service provider to perform this additional processing. If so, the fax server processes the fax message to produce a searchable electronic document (at block 49). In particular, the document processing component 24 may perform Optical Character Recognition (OCR) operations for automatic text recognition of the fax message (e.g., document) to generate an OCR'd document (e.g., a OCR'd searchable PDF document). In another embodiment, the component may also perform Natural Language Processing (NLP) operations in order to determine corresponding text (e.g., data, such as metadata) of semi-structured data, such as tables, diagrams, symbols, images, etc., which may be contained within the fax message. In some embodiments, the fax server may process the fax message according to one or both of OCR and NPL operations in order to produce the searchable electronic document. In one embodiment, the searchable electronic document may be in any file format that is designed to allow a user to search its contents, such as a searchable PDF.

The server generates an electronic message that includes the (e.g., searchable electronic) document and the fax telephone number (e.g., as metadata) (at block 50). In one embodiment, the document may be the produced searchable electronic document and/or the document may be the original fax message in any format, such as a fax format, as described herein. The fax server may generate the electronic message according to an international medical standard that includes at least one of the DICOM standard and the HL7 standard, as described herein. For instance, when the document is an image (or includes at least one image), the fax server may generate a DICOM message. In one embodiment, when generating a HL7 message, the fax server may convert the document into another document type, such as a H17-CDA document that is to be included within the HL7 message. In another embodiment, the server may generate an e-mail message that includes the document as an attachment. In this case, the fax telephone number may be included as metadata within the document and/or within the e-mail message, such as in a subject line and/or the body of the e-mail. In another embodiment, the fax server may generate one or more secure direct messages by encrypting the electronic document. For instance, the message may be encrypted using to any encryption method (e.g., Advanced Encryption Standard (AES), etc.). In some embodiments, the secure message may be encrypted according to HIPPA requirements, such that the message meets the requirements. In another embodiment, the server may generate any electronic message according to any transmission protocol for transmission across a computer network.

The fax server 6 transmits, over the computer network, the (e.g., generated) electronic message that includes the fax message (e.g., document) and the fax telephone number to a destination address based to the fax telephone number (at block 51). For instance, when the destination address is (or is a part of) an e-mail address, the fax software transmits an e-mail (as the electronic message) that includes the document to the e-mail address, where the fax telephone number may be a part of the e-mail address, as described herein. As another example, when the destination address is a (e.g., mobile) telephone number, the fax software may transmit the document in (or as) a Short Message Service (SMS) message and/or a Multimedia Messaging Service (MMS) message. In another aspect, the electronic message may be transmitted via a communication data connection, as described herein. In this case, a determined destination address may be a server's (or computer's) domain name or address (e.g., IP address) and the fax software may establish, over the computer network, the connection with the destination device according to the IP address. Once established, the fax software transmits the electronic message via the connection. In one embodiment, the fax software may transmit the message according to an encryption protocol, such as TLS protocol as described herein. In one embodiment, the fax telephone number may be a part of the electronic message. For instance, when the electronic message is an e-mail, the fax telephone number may be in the body of the e-mail or in the subject line. In another embodiment, the fax telephone number may be included as metadata in one or more headers of one or more IP data packets that are used to transmit the electronic message (e.g., over an established connection). In another embodiment, the fax telephone number may be added to the electronic message.

In one embodiment, the server may determine how to generate (and transmit) the electronic message based on subscriber data 25. For instance, the determination may be based on the destination address, such as when the destination address is an e-mail address, the server may generate and transmit an e-mail message as the electronic message. As another example, the subscriber data may indicate how the document is to be transmitted based on subscriber preferences, such as whether the data indicates that the message is to be securely transmitted across an established VPN connection.

The server audits one or more of the performed operations at block 45, as described herein. For instance, the server may (determine and) store information regarding the reception of the incoming fax transmission, the processing of the fax (e.g., the performance of the OCR/NPL), and/or the transmission of the electronic message.

FIG. 5 is a flowchart of the process 60 for receiving and distributing incoming fax transmissions that are received over the computer network 5, according to one embodiment. As shown, the process 60 includes one or more operations performed by process 40 in FIG. 4. Thus, at least some of these operations may be performed in a similar fashion as described in FIG. 4.

The process 60 begins by the fax server 6 receiving, over a computer network 5, an incoming fax transmission that includes a fax message and a fax telephone number (at block 61). As described herein, the fax message may be a document that includes at least one of text and images. In one embodiment, the incoming fax transmission may be an electronic message that includes an electronic document (as the fax message) and a fax telephone number. For instance, the electronic message may include the document as an attachment and includes the fax telephone number as a recipient address to which the document is being transmitted (e.g., by a source device). In one embodiment, the document may be in any format, such as a fax format (e.g., TIFF, etc.). In another embodiment, the electronic document may be a (e.g., first) searchable electronic document in any format, such as a word processing format, PDF, etc., as described herein. Such a document may include (embedded) formatting (e.g., as metadata), such as font selection, font size, font color, spacing, margins, alignment, images overlaid on the document, etc. In some embodiments, the recipient address may be data (e.g., metadata) that is a part of (e.g., a header of one or more data packets that include) the electronic message. For example, when the electronic message is an e-mail, the recipient address is the e-mail address to which the e-mail is being sent. In this case, the fax software 23 may receive the e-mail that has been routed to the fax server based on the e-mail's domain address. As described herein, the user name of the e-mail address may include the fax telephone number (e.g., as a recipient address). As described herein, the electronic document may be received via a communication data connection that is (e.g., previously) established between a source device and the fax server. In one embodiment, the fax telephone number may be received based on the established connection. For instance, the fax telephone number may be a part of a domain of a URL that is used to establish a connection over a file transfer protocol, such as HTTPS.

The fax server determines if the fax telephone number is assigned to a subscriber (and/or a user associated with the subscriber) of a fax service (at decision block 43). For example, the fax telephone number may be assigned to a patient of a health care provider. In another embodiment, the fax telephone number may be assigned to an organization of several organizations (e.g., being assigned to a healthcare provider of several providers). If not, the server proceeds to convert the fax message into a fax format, such as TIFF (at block 62). Specifically, the server converts the electronic document, which may be a searchable document in a word processing format, into a TIFF. The server transmits the converted fax message, over the circuit-switched network, as a fax transmission (at block 44). For instance, the fax server places an outgoing call to the fax telephone number and sends the fax formatted messaged over the outgoing call, as described herein. The server audits one or more of the performed operations, as described herein (at block 45).

If, however, the fax telephone number is assigned to the subscriber of the fax service, the fax server determines a destination address based on the fax telephone number (at block 46). The fax server determines if the fax message is to be transmitted electronically (e.g., as an electronic message over the computer network 5) based on the destination address (at block 47). If so, the fax server determines if the fax message is to be processed as a searchable document (at block 48). Specifically, the fax server may make this determination based on subscriber preferences in the subscriber data 25.

If the fax message is to be processed as a searchable document, the fax server generates a (e.g., second) searchable electronic document (e.g., a searchable PDF document) from the received fax message (at block 63). For instance, the document processing component 24 may perform Optical Character Recognition (OCR) software upon the fax message, which may be an electronic document (e.g., a PDF file, a TIFF file, etc.) to generate the searchable document. As another example, the document processing component 24 may convert the electronic document, which may be in any searchable format, such as a word processing format, a spreadsheet format, etc. into a second searchable electronic document (second document). In one embodiment, the second document may be in a same or different file format than the first document. For example, when the first document is a word processing document, the second document may be a searchable PDF document. In one embodiment, the document processing component may use any known conversion software application to convert the first document into the second document. For example, the document processing component may use any type of PDF conversion software to convert the electronic document into a searchable PDF document.

In one embodiment, the second document may retain some or all characteristics of the first (original) document. For example, the second document may include a same (or different) number of pages as the first document. As described herein, the second document may retain some or all of the formatting of the original (searchable) electronic document, such as font selection, font size, font color, spacing, etc. As another example, the formatting may be retained as metadata, such as for a PDF document that may retain at least some metadata (e.g., in Extensible Markup Language (XML) format) of the original document, such as author, file name, date, and other settings/preferences.

The fax server authenticates the generated searchable electronic document by adding an electronic signature to the document (at block 64). The electronic signature may include text (and/or images) that is added to at least a portion one or more pages of the searchable electronic document (e.g., within a margin). In one embodiment, once the electronic signature is added, it may be permanent on the document, such that the signature may not be editable or manipulated by a user through the use of a document viewing software application. In one embodiment, the electronic signature authenticates the second document by including information regarding the incoming fax transmission. For example, the signature may include at least one of a timestamp of when the incoming fax transmission was received by the fax server, a number of pages of the second document, source device information (e.g., a source device's inbound address, such as an inbound (fax) telephone number, an inbound e-mail address, etc.). In one embodiment, the electronic signature may include at least some of the same information that is included in a fax header of a fax that is transmitted as audio-frequency tones, as described herein. In another embodiment, the electronic signature may resemble the fax header, such as being positioned along a header portion of the second document.

The fax server 6 generates an electronic message that includes the (e.g., first and/or second) document and the fax telephone number (e.g., as metadata) (at block 50). The fax server 6 transmits, over the computer network 5, the generated electronic message to the destination address (at block 51). The fax server audits one or more of the performed operations (at block 45). For instance, the server may (determine and) store information regarding the reception of the first (e.g., searchable) electronic document, the generation of the second searchable electronic document, and the transmission of the electronic message.

Some embodiments perform variations of the processes 30, 40, and/or 60. For example, the specific operations of at least some of these processes may not be performed in the exact order shown and described. The specific operations may not be performed in one continuous series of operations, some operations may be omitted, and different specific operations may be performed in different embodiments. For instance, the server 9 may receive the one or more destination addresses upon receiving the information regarding the user at block 31. In another embodiment, the fax server 6 may receive the destination addresses directly from the user (e.g., via a website that is accessed through the Internet). In another embodiment, destination addresses may be periodically updated (e.g., adding and/or removing addresses) with the fax service provider server 6. For example, since the fax telephone number is permanently assigned to the subscriber and/or user, the user, who may be a patient, may change healthcare service providers throughout their lifetime. Thus, when a user changes healthcare service providers, destination addresses may be updated to remove old healthcare service providers and add destination addresses of new healthcare service providers.

In one embodiment, at least some of the operations describe herein are optional operations that may or may not be performed. Specifically, blocks that are illustrated as having dashed or dotted boundaries may optionally be performed by (e.g., the one or more processors 21 of) the fax service provider server 6. For example, the fax server 6 may optionally generate an electronic message that includes the document and the fax telephone number at block 50. In some cases, the fax server may generate the electronic message, such as generating an e-mail message to be sent over the computer network, and generating secure direct messages. In some cases, however, the fax server may not generate an electronic message. Instead, the fax server may (e.g., directly) transmit the electronic document to a destination address. As an example, when the destination address is a URL address, the fax server may establish a communication data connection with the URL address (e.g., according to HTTPS), and transmit the electronic document over the data connection (e.g., as one or more data packets). As another example, the conversion of the document to a fax format at block 62 in FIG. 5 may be optional. For instance, these operations may be optional when the fax message that is received in the incoming fax transmission is already in a fax format, such as being a TIFF file.

In another embodiment, at least some of the operations described herein may be performed in any order and/or multiple times throughout at least some of the processes described herein. For example, rather than (or in addition to) auditing the performed operations after transmission of the fax transmission (or the electronic message), the server may audit the operations as they are performed. As an example, upon receiving the first searchable electronic document, the server may determine and store a reception time stamp that indicates the time at which the document was received. At or after each step the server may store information regarding the operation(s) performed at that step.

Figure 6:
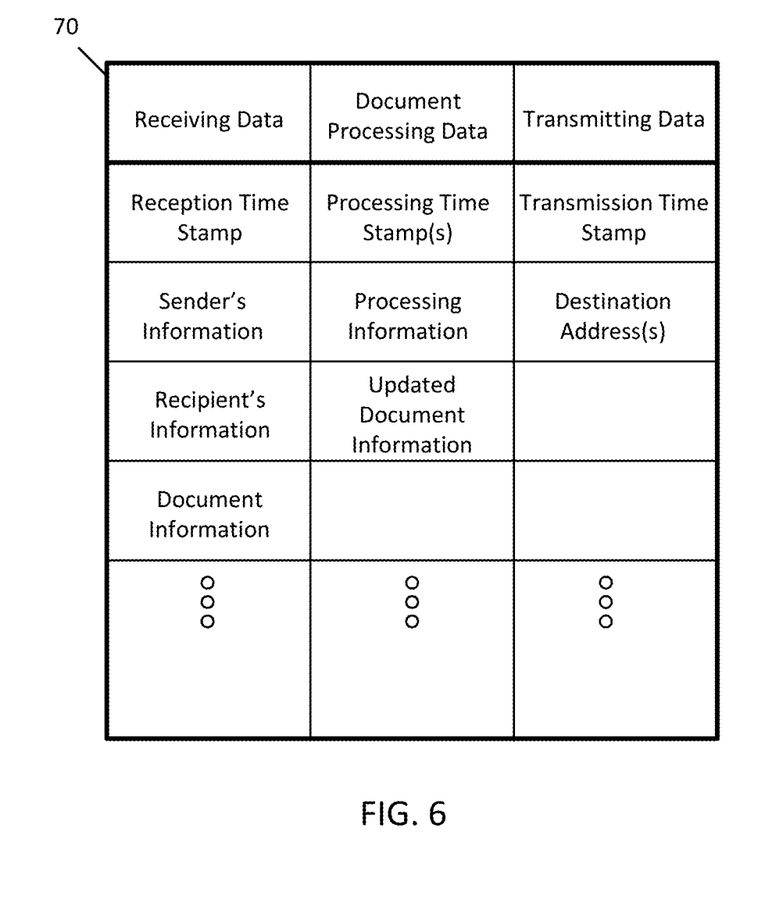
FIG. 6 illustrates a data structure that includes auditing data associated with the processing of the fax transmission, according to some embodiments.

FIG. 6 illustrates a data structure 70 that includes auditing data 26 associated with the processing of the fax transmission, according to some embodiments. Specifically, the data structure includes a table that includes data regarding an incoming fax transmission to the fax server 6. As shown, the table includes receiving data, document processing data, and transmitting data. The receiving data includes information regarding a received incoming fax transmission, which includes a reception time stamp that indicates a time at which the fax transmission was received, sender's (or source) information, such as a phone number or e-mail address of the sender, recipient's information that may include a fax telephone number to which the incoming fax transmission is being sent, and document information that includes information regarding the incoming fax transmission, such as the number of pages, document type, etc. In one embodiment, the server 6 may determine and store the receiving data upon receiving the incoming fax.

The document processing data may include information regarding when and how an incoming fax transmission is processed by the fax server. For example, the processing data may include processing time stamp(s) that indicate when a document is processed, processing information that indicates how the document is processed (e.g., indicating that a first searchable electronic document is converted into a second searchable electronic document and what format the document is converted from and into, etc.), and updated document information (e.g., indicating that the processed document's page size changed from five pages to six pages, etc.). The transmitting data may include information regarding the transmission (or routing) of the fax transmission, which may include a transmission time stamp and destination address(es) to which the fax has been routed. In one embodiment, more or less information may be stored within the data structure.

An embodiment may be an article of manufacture in which a non-transitory machine-readable storage medium has stored thereon instructions which program one or more data processing components (generically referred to here as "a processor") to perform the operations described above. For example, in one embodiment, the above-described processes 30, 40, and 60 of FIGS. 3-5, respectively may be performed by the processor 21 that is executing instructions stored in the non-transitory machine-readable storage medium. The non-transitory machine-readable storage medium may be a part of the fax server 6, as described herein. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of an electronic device, the method comprising:
    receiving a request by an organization of a plurality of organizations for a fax telephone number to be assigned to the organization;
    permanently assigning the fax telephone number to the organization such that the fax telephone number will never be recycled to a different organization;
    receiving, over a computer network, an electronic message that includes an electronic document and the fax telephone number of the organization, wherein the fax telephone number uniquely identifies the organization from other organizations of the plurality of organizations;
    determining a destination address of the organization using the fax telephone number, wherein the destination address is different than the fax telephone number; and
    transmitting the electronic document and the fax telephone number to the destination address.

2. The method of claim 1, wherein the plurality of organizations are healthcare service providers and the fax telephone number is one of a plurality of fax telephone numbers each of which uniquely identifying a different one of the healthcare service providers.

3. The method of claim 1 further comprising generating a secure direct message by encrypting the electronic document, wherein transmitting the electronic document comprises transmitting the secure direct message.

4. The method of claim 3, wherein the generated secure direct message is encrypted according to the Health Insurance Portability and Accountability Act (HIPAA) requirements.

5. The method of claim 1 further comprising: determining whether to perform document processing upon the electronic document based on the fax telephone number, in response to determining that the electronic document is to be processed,
generating a searchable electronic document from the electronic document; and
authenticating the searchable electronic document by adding an electronic signature to the searchable electronic document that includes at least one of a timestamp of when the electronic message was received, a number of pages of the searchable electronic document, and information of a source device from which the electronic message was received.

6. The method of claim 1, wherein the destination address is an Internet Protocol (IP) address or a domain name of a destination device, wherein transmitting the electronic message comprises:
establishing, over the computer network and using the IP address or the domain name, a communication data connection with the destination device; and
transmitting the electronic message via the communication data connection.

7. The method of claim 6, wherein the communication data connection is a Virtual Private Network (VPN) connection.

8. A system comprising:
a processor; and
non-transitory machine-readable storage medium having instructions stored therein which when executed by the processor causes the system to
receive a request by an organization of a plurality of organizations for a fax telephone number to be assigned to the organization,
permanently assign the fax telephone number to the organization such that the fax telephone number will never be recycled to a different organization,
receive, over a computer network, an electronic message that includes an electronic document and the fax telephone number of the organization, wherein the fax telephone number uniquely identifies the organization from other organizations of the plurality of organizations,
determine a destination address of the organization using the fax telephone number, wherein the destination address is different than the fax telephone number, and
transmit the electronic document and the fax telephone number to the destination address.

9. The system of claim 8, wherein the plurality of organizations are healthcare service providers and the fax telephone number is one of a plurality of fax telephone numbers each of which uniquely identifying a different one of the healthcare service providers.

10. The system of claim 8, wherein the non-transitory machine-readable storage medium has further instructions to generate a secure direct message by encrypting the electronic document, wherein transmitting the electronic document comprises instructions to transmit the secure direct message.

11. The system of claim 10, wherein the generated secure direct message is encrypted according to Health Insurance Portability and Accountability Act (HIPAA) requirements.

12. The system of claim 8, wherein the non-transitory machine-readable storage medium has further instructions to
determine whether to perform document processing upon the electronic document based on the fax telephone number;
in response to determining that the electronic document is to be processed,
generate a searchable electronic document from the electronic document; and
authenticate the searchable electronic document by adding an electronic signature to the searchable electronic document that includes at least one of a timestamp of when the electronic message was received, a number of pages of the searchable electronic document, and information of a source device from which the electronic message was received.

13. The system of claim 8, wherein the destination address is an Internet Protocol (IP) address or a domain name of a destination device, wherein instructions to transmit the electronic message comprises instructions to
establish, over the computer network and using the IP address or the domain name, a communication data connection with the destination device; and
transmit the electronic message via the communication data connection.

14. A non-transitory machine-readable storage medium having stored therein instructions which when executed by a processor:
receive a request by an organization of a plurality of organizations for a fax telephone number to be assigned to the organization,
permanently assign the fax telephone number to the organization such that the fax telephone number will never be recycled to a different organization,
receive, over a computer network, an electronic message that includes an electronic document and the fax telephone number of the organization, wherein the fax telephone number uniquely identifies the organization from other organizations of the plurality of organizations,
determine a destination address of the organization using the fax telephone number, wherein the destination address is different than the fax telephone number, and
transmit the electronic document and the fax telephone number to the destination address.

15. The non-transitory machine-readable storage medium of claim 14, wherein the plurality of organizations are healthcare service providers and the fax telephone number is one of a plurality of fax telephone numbers each of which uniquely identifying a different one of the healthcare service providers.

16. The non-transitory machine-readable storage medium of claim 14 has further instructions to generate a secure direct message by encrypting the electronic document, wherein transmitting the electronic document comprises instructions to transmit the secure direct message.

17. The non-transitory machine-readable storage medium of claim 16, wherein the generated secure direct message is encrypted according to Health Insurance Portability and Accountability Act (HIPAA) requirements.

18. The non-transitory machine-readable storage medium of claim 14 has further instructions to determine whether to perform document processing upon the electronic document based on the fax telephone number;

in response to determining that the electronic document is to be processed, generate a searchable electronic document from the electronic document; and authenticate the searchable electronic document by adding an electronic signature to the searchable electronic document that includes at least one of a timestamp of when the electronic message was received, a number of pages of the searchable electronic document, and information of a source device from which the electronic message was received.

19. The non-transitory machine-readable storage medium of claim 14, wherein the destination address is an Internet Protocol (IP) address or a domain name of a destination device, wherein instructions to transmit the electronic message comprises instructions to establish, over the computer network and using the IP address or the domain name, a communication data connection with the destination device; and transmit the electronic message via the communication data connection.

\* \* \* \* \*